Nov. 29, 1960 A. POLLAK 2,962,666

OSCILLATOR SYNCHRONIZING CIRCUIT WITH VARIABLE PULL-IN RANGE

Filed Oct. 6, 1959

INVENTOR
Alfred Pollak

BY George H. Spencer

ATTORNEY 2,962,666

OSCILLATOR SYNCHRONIZING CIRCUIT WITH VARIABLE PULL-IN RANGE

Alfred Pollak, Hannover, Germany, assignor to Telefunken G.m.b.H., Berlin, Germany Filed Oct. 6, 1959, Ser. No. 844,682
Claims priority, application Germany Oct. 9, 1958
2 Claims. (Cl. 331—11)

The present invention relates to improvements in circuits for pulling-in the oscillation frequency of an oscillator to synchronize it with externally supplied synchronizing pulses.

A system has been suggested in copending U.S. application, Serial No. 763,961, filed September 29, 1958, of the same assignee as the present application, for synchronizing an oscillator with a synchronizing pulse sequence by using a phase comparison system in which the pull-in range is varied as a function of a control voltage derived from the coincidence of synchronizing pulses and oscillation comparison pulses. Such a circuit has the advantage that the pull-in range can be designed very small for the normal operation at synchronism, whereby an extremely small susceptibility to disturbances in the system is obtained but, wherein, as soon as this circuit falls out of step, the pull-in range is automatically expanded by means of a control voltage derived from the coincidence circuit.

It is an object of the present invention to provide such synchronizing system with minimum complexity, but with great efficiency.

It is another object of the invention to provide, in connection with a damping resistance between the phase comparison circuit and the oscillator, a switch controlled by the degree of phase coincidence to expand the pull-in range whenever the oscillator falls out of synchronization in such a manner, that the whole control circuit is caused to oscillate until synchronization is restored.

In a preferred embodiment of the invention, the switch comprises a diode having a small resistance at synchronism, said diode being blocked when the synchronism is lost, thereby reducing the value of a resistance which is shunted across the diode, said resistance determining the extent of expansion of the pull-in range, i.e. the amplitude of the oscillation of the whole control circuit.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
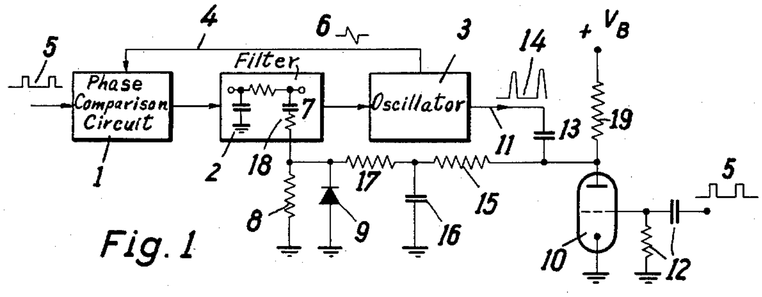
Figure 1 is a schematic diagram showing a circuit according to the present invention.

The embodiment of Figure 1 shows a control circuit comprising a phase comparison circuit 1 a filter 2, an oscillator 3 and a comparison feedback path 4, said control circuit serving to indirectly synchronize the oscillator 3 with an externally supplied synchronizing pulse sequence 5. Such control circuit produces a D.C. control voltage in a manner known per se, which is a function of the phase condition of the synchronizing pulse sequence 5 and a comparison oscillation 6 derived from the oscillator, said D.C. control voltage being used for correcting the frequency of the oscillator 3 after being filtered by means of the filter 2. In this case, the steepness o fthe control characteristic of the circuit described so far is determined, among other factors, by the design of the filter 2 and the amplitude of the comparison oscillation 6. In order to avoid self-oscillation in such a feedback circuit, the filter 2 is provided with a time constant circuit, including the members 7, 8 and 18, for smoothing the control voltage.

The circuit arrangement described in the foregoing has been known per se. The characteristic steepness of the pull-in range of the control circuit can be selected so small, for example, ±100 cycles, disregarding the compromise solutions heretofore mentioned between the pull-in range and susceptibility to disturbances, that brief spurious disturbances cannot cause the oscillator to fall out of step.

In order to be able to restore synchronism after the oscillator has fallen out of step through a large frequency deviation of, for example, ±500 cycles, a diode 9 is shunted across the resistance 8 of the attenuation circuit 7, 8 and 18, said resistance affecting the time constant of the control circuit wherein said diode is blocked or opened by a second coincidence circuit, including a tube or triode 10, as a function of the coincidence of the synchronous pulses 5 and a comparison pulse sequence 11 derived from the oscillator 3. The triode 10 is used as a second phase comparison means to generate a second control voltage used as the switching voltage, said triode principally operating like a trigger control. The synchronizing pulses are fed to the control grid of this tube via an RC circuit 12 in such a manner, that a peak rectification occurs at the peak value of the synchronizing pulses. Also positive pulses 14, representing the oscillator frequency, are fed to the anode of the triode 10 via a condenser 13. Such pulses are available, for example, in a television receiver at the line deflection transformer during the return sweep. If the triode grid is biased conductively, the anode and cathode path represents a diode with relatively high resistance. The return sweep pulses 14 are rectified in this diode and an average D.C. voltage appears across the anode resistance of the triode, the magnitude of this D.C. voltage depending upon the anode resistance, upon the positive biasing voltage on the grid and upon the amplitude of the return sweep pulses. The rectified voltage is filtered by the filter 15, 16, and is fed to the cathode of the diode 9 via a resistance 17. As long as phase coincidence exists between the synchronizing pulses 5 and the comparison pulses 14, a negative voltage is generated at the anode of the triode 10, said voltage biasing the diode forwardly. In this case, the negative voltage is selected to approximately equal such value, that the internal resistance of the diode amounts to about 800 ohms. When the phase relation between the synchronizing pulses 5 and the comparison pulses 14 is out of step, the resistance of the diode path through the anode and cathode of the triode becomes very high and the rectification of the peaks of the pulses ceases almost entirely. Therefore, a positive voltage appears which is obtained from the voltage division across the resistances 15, 8, 17 and 9. As a result of this, the cathode of the diode 9 is biased positively and cut off. Thus, the attenuation circuit 7, 8 and 18 has a resistance resulting from the shunting of the resistances 8 and 17. In order to avoid hunting during pull-in, it is suitable to select the time constant of the circuit components 15, 16 and 17 serving to filter the switch voltage relatively large.

Figure 2:
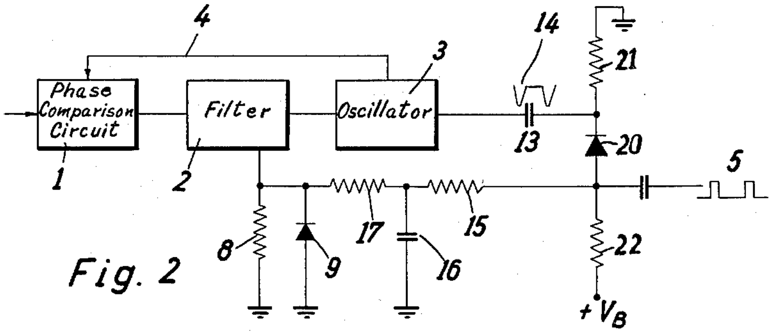
Figure 2 is a modified schematic diagram.

It is possible to generate the switch voltage for the diode 9 by means of a diode 20 rather than a triode 10. Such circuit is shown in Figure 2 and is suitable, due to its reduced complexity and expense, particularly if amplification of the switch voltage is not necessary. In the circuit of Figure 2, the cathode of diode 20 is grounded by way of a resistor 21, while the anode is connected to the operating voltage $V_B$ by way of a resistor 22. When the positive synchronizing pulses 5 fed to the anode of the diode 20 are in phase with the negative comparison pulses 14, the internal resistance of the diode is small, so that an intermediate negative D.C. voltage appears across the anode resistance, thereby rendering the diode 9 conductive. As soon as the impulses are out of phase with each other, the diode 20 is rendered non-conductive, thereby producing a positive switching voltage which depends on the particular values of the resistors 22, 15, 17 and 8, these resistors acting as a voltage divider. The switching voltage is thus obtained in a manner similar to that produced by the circuit of Figure 1.

Figure 3:
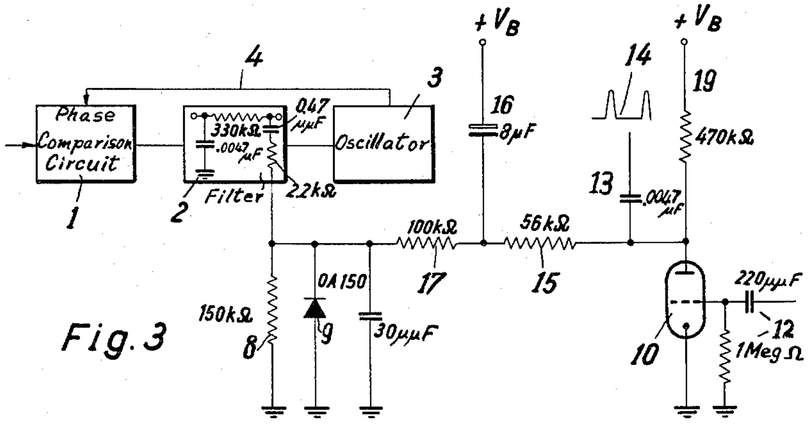
Figure 3 is a schematic diagram of a working embodiment of the invention.

Figure 3 illustrates a working example of a circuit resembling that schematically shown in Figure 1, showing circuit values. The circuit of Figure 3 differs from that of Figure 1 only in that the capacitor 16 is connected to the positive operating voltage $V_B$ instead of to ground, and that an additional very small capacitance is connected in parallel with the diode 9, the operation of the circuit of Figure 3 being identical to that of Figure 1.

I claim:

1. A system for synchronizing an oscillator with a synchronizing pulse sequence comprising, means for deriving a comparison sequence from said oscillator; first phase comparison means receiving said sequences and delivering a control voltage proportional to the degree of coincidence; oscillator control means receiving said control voltage and restoring coincidence by pulling the oscillator frequency into step with the synchronizing pulses; filter means interposed between said first comparison means and said oscillator control means and comprising a resistance for damping the control circuit; second phase comparison means receiving said sequences and delivering a second control voltage proportional to the degree of coincidence; switching means connected with said resistance for altering its value thereby causing the control circuit to oscillate freely, said switching means being connected to receive said second control voltage.

2. In a system as set forth in claim 1, said switching means comprising a diode shunted across at least a part of said resistance, and said second control voltage being connected to said diode so that the conductivity of the latter is switched according to the degree of coincidence of said sequences.

References Cited in the file of this patent

UNITED STATES PATENTS

| | | |
|---|---|---|
| 2,730,616 | Bastow | Jan. 10, 1956 |
| 2,764,681 | Howell | Sept. 25, 1956 |
| 2,828,419 | Gruen | Mar. 25, 1958 |
| 2,932,793 | Smith et al. | Apr. 12, 1960 |